United States Patent [19]
Main et al.

[11] Patent Number: 5,216,233
[45] Date of Patent: Jun. 1, 1993

[54] VERSATILE RF TERMINAL-SCANNER SYSTEM

[75] Inventors: Douglas W. Main, Cedar Rapids; Tim A. Kassens, Marion, both of Iowa

[73] Assignee: Norand Corporation, Cedar Rapids, Iowa

[21] Appl. No.: 966,907

[22] Filed: Oct. 26, 1992

Related U.S. Application Data

[63] Continuation of Ser. No. 321,932, Mar. 9, 1989, abandoned.

[51] Int. Cl.[5] ............................................. G06F 7/10
[52] U.S. Cl. ........................................ 235/472; 235/383; 235/454
[58] Field of Search ........................ 235/454, 472, 383

[56] References Cited

U.S. PATENT DOCUMENTS

| | | | |
|---|---|---|---|
| 3,826,900 | 7/1974 | Moellering | 235/472 |
| 4,415,065 | 11/1983 | Sandstedt | 235/383 |
| 4,621,189 | 11/1986 | Kumar | 235/454 |
| 4,766,300 | 8/1988 | Chadima | 235/472 |
| 4,845,350 | 7/1989 | Shephard | 235/472 |
| 4,916,441 | 4/1990 | Gombrich | 340/712 |

Primary Examiner—Harold Pitts
Attorney, Agent, or Firm—McAndrews, Held & Malloy

[57] ABSTRACT

In a preferred data capture system, a RF data terminal is capable of use alone or with any of a series of scanner modules incorporating diverse scanner technologies such as CCD bar code scanning, area image data reading, cyclically swept laser beam bar code scanning, and RF identification label scanning. In each case, a frontal operating panel of the RF terminal—scanner system is held facing the user during scanning, whether the system is held with the right or left hand. Scanner data is supplied to the RF unit by mating connectors or the like. From the RF unit, the scanner data may be transmitted on-line to a host computer or other receiving station. The family of scanner modules may provide respective laser scanners with respective different wavelengths of illumination so that an optimum module may be selected for reading respective bar codes of differing color characteristics. The family is readily upgraded to incorporate new light sources of greater efficiency and/or more advantageous spectrum. Respective types of CCD modules may be operative at different scanning distances so as to adapt a standard data terminal to different fields of use.

36 Claims, 4 Drawing Sheets

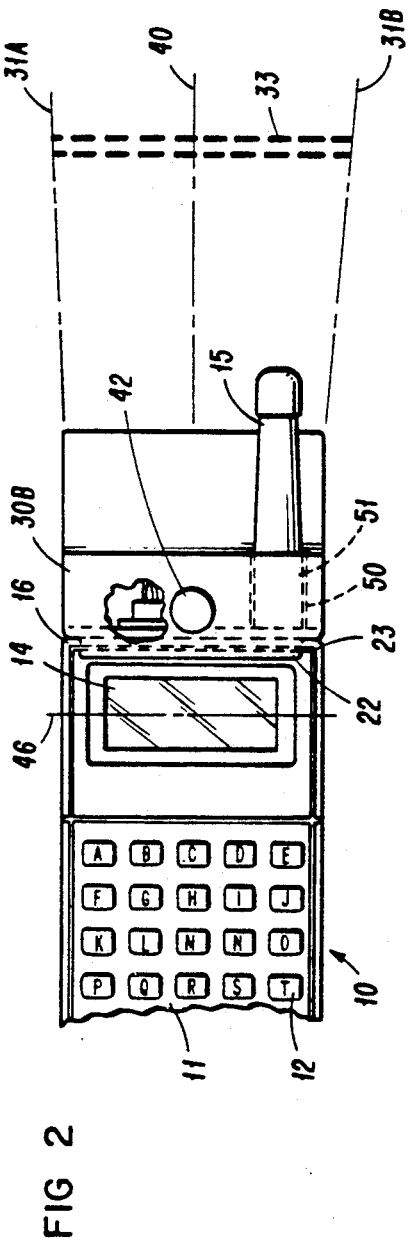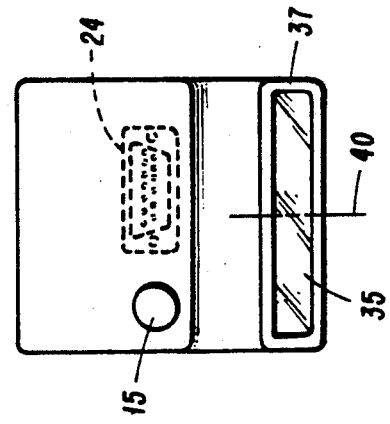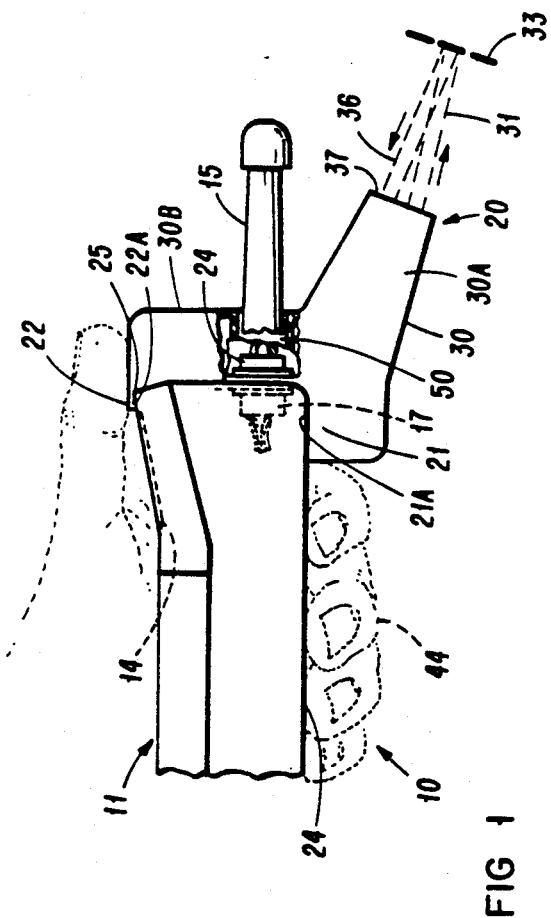

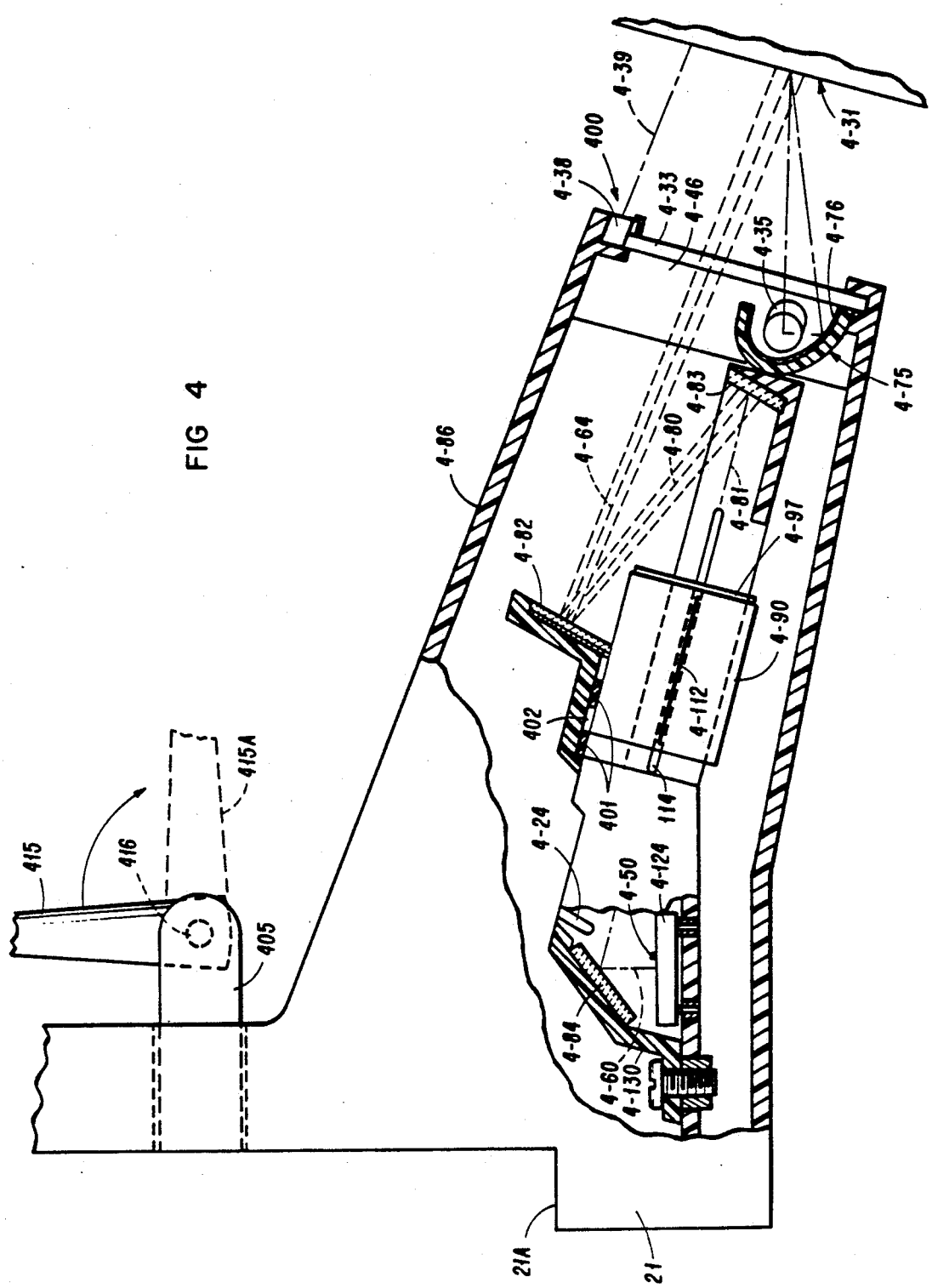

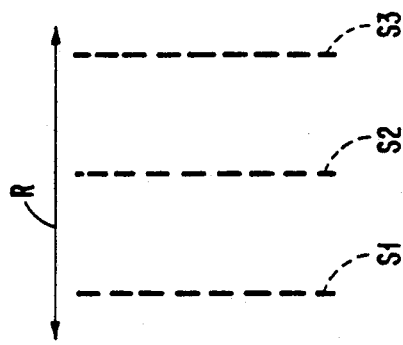
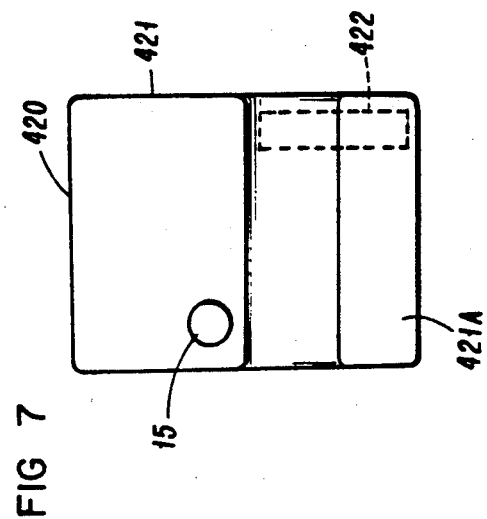
FIG 7
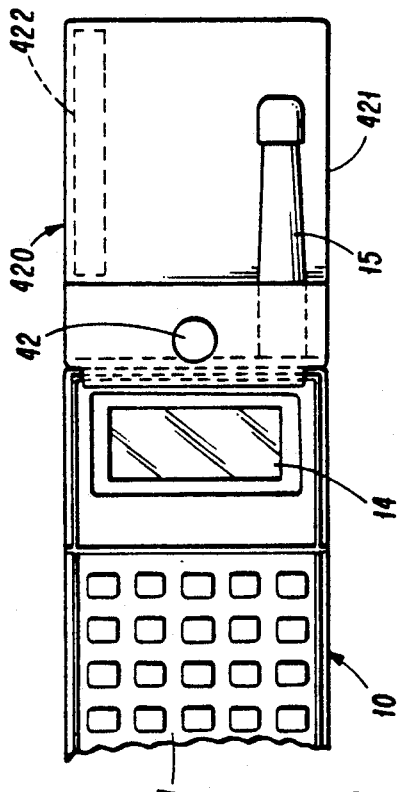
FIG 6
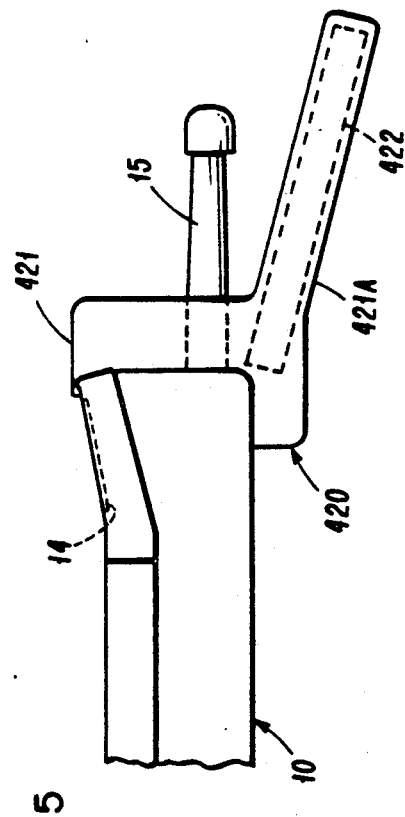
FIG 5

VERSATILE RF TERMINAL-SCANNER SYSTEM

This is a continuation of application Ser. No. 07/321,932 filed Mar. 9, 1989 now abandoned.

BACKGROUND OF THE INVENTION

This invention relates to the field of automatic data capture, and particularly to data capture systems for reading data such as bar code symbols on containers, and the like, and for transmitting the scanned data via a radiant energy link to a receiving station, e.g. associated with a host computer.

In the field of retail automation, for example, it is highly advantageous to be able to manipulate a data capture unit having scanner and RF coupling capabilities with one hand, while having the other hand free. While such a laser bar code scanner with an RF link has been proposed, this was a complex special purpose device. A terminal with a detachable scanner has also been proposed, but without RF capability and limited to contact scanning where the terminal-scanner system must be carefully guided so as to remain in contact over the length of a bar code symbol or other data source line.

SUMMARY OF THE INVENTION

In accordance with a concept of the present invention an existing or standard RF terminal configuration can be selectively adapted to diverse types of scanning technologies by means of respective scanner modules. By way of example, a commercially available radio data terminal may presently have an external connector fitting for transmitting operating power to bar code readers of diverse types such as CCD, various light pens and five-volt laser scanners, and for transmitting scanner data on-line to a host processor. A given RF data terminal may be equipped with a scanner module such as to enable scanning of an entire bar code symbol or other data source line while the terminal-scanner module system is briefly held by one hand in scanning relationship thereto. Further respective types of noncontact scanner modules which are optimum for various applications may be selectively applied to a common RF terminal configuration.

It is therefore an object of the present invention to provide a unitary handheld data capture system including a scanner module of any desired scanner technology and a standardized data capture terminal which is operable with diverse types of scanner modules to transmit scanner data via a radiant energy link to a host computer system or other receiving station.

With a preferred scanner module construction, the handheld data capture system may be held in scanning position in either hand, with a frontal operating face of the data terminal facing the user, such orientation facilitating observation of a user interface means on the frontal operating face (such as a data display or the like) during scanning operation.

For the case of a CCD or laser beam scanner wherein a scan energy path is in the form of a flat sheet-like sector, a vertical median plane of the scan energy path preferably essentially bisects the data terminal frontal operating face along its longitudinal axis. Where a bar code symbol or other data source line is oriented with its axis generally horizontal, the terminal frontal operating panel is held with the user's palm generally horizontal and the operating panel facing the user for optimum viewing.

For noncontact scanner modules with optimum scanning distances of a few inches or less in front of the module, the terminal may be grasped by the user at the end adjacent such a scanner module, and the scanner module may have a central trigger button which is readily actuated by the thumb of the hand holding the terminal. With the terminal held horizontally, the plane of a sheet like scanner field may preferably be inclined downwardly so as to directed toward bar codes supported at the height of a store counter top or the like. The scanner module may be shaped in general conformity to the scanner field to facilitate aiming.

Other objects, features and advantages of the present invention will be apparent to those skilled in the art from the following detailed description taken in connection with the accompanying figures of drawings, and from the recitations of the appended claims.

BRIEF DESCRIPTION OF THE DRAWINGS

FIG. 1 is a partial somewhat diagrammatic side elevational view of a handheld data capture system in accordance with the present invention.

FIG. 2 is a partial top plan view of the data capture system of FIG. 1.

FIG. 3 is an end elevational view of the data capture system of the FIGS. 1 and 2.

FIG. 4 is a somewhat diagrammatic longitudinal sectional view showing a scanner module construction wherein different focal distances can be selected to provide different types of modules with respective different operative scanning distances but all utilizing a common scanner technology, e.g. CCD scanner technology.

FIG. 5 is a partial diagrammatic side elevational view showing an RF/ID scanner module applied to the standard data terminal of FIGS. 1-3.

FIG. 6 is a diagrammatic partial top plan view of the embodiment of FIG. 5.

FIG. 7 is a diagrammatic end elevational view of the embodiment of FIGS. 5 and 6.

DETAILED DESCRIPTION

Figure 10:
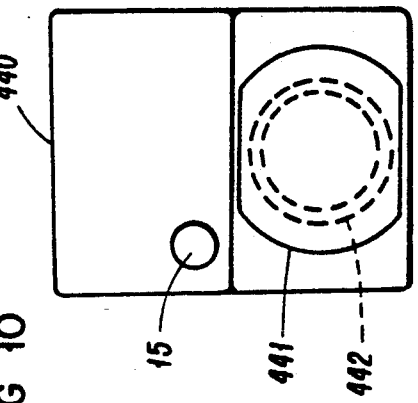
FIG. 10 is a diagrammatic end elevational view of the embodiment of FIGS. 8 and 9.

FIGS. 1 and 2 show a commercially available handheld radio data terminal 10 known as the RT2210 terminal of Norand Corporation, Cedar Rapids, Iowa. The RT2210 terminal is of generally rectilinear configuration with a length of 9.4 inches, a width of 3.4 inches and a height of 1.8 inches (23.9 cm × 8.6 cm × 4.6 cm) and a weight of 2.0 pounds (0.9 kg). A frontal operating face 11 of the terminal has user interface means such as a keyboard with keys such as 12 and a display 14. With the terminal in an upright orientation, an antenna 15 would extend vertically from an upper end 16.

Further information on the RT2210 terminal is found in APPENDIX A following this DETAILED DESCRIPTION. As diagrammatically indicated at 17, FIG. 1, the end wall 16 of the RT2210 terminal is provided with an externally accessible 15-position D type connector which in normal use receives a cooperating D connector with fifteen pins. In the RT2210, various types of scanners are coupled to the connector 17 via cable, for example light pens, CCD bar code readers and five volt laser/laser-diode scanners, without requirement for external communication interfaces or power supplies. The RT2210 is designed for two-way on line communication with a host computer so that accuracy of scanner data from the various scanners can be immediately verified by the host computer, and any errors can be eliminated at the transaction level. An audio annunciator in the terminal will signal whether a scanned bar code has been properly or improperly decoded.

In the illustrated embodiment, a scanner module 20 is shown with securing means 21, 22 forming a socket for receiving the end 16 of the terminal 10. The scanner module 20 carries an external data coupler means 24 which is arranged to mate with the terminal external data coupler means 17 as the scanner module is affixed to end 16 of the terminal. In the specific illustrated embodiment, the securing means 22 forms a flexible latch which snaps into engagement with a marginal rim 23 extending about the perimeter of the operating face 11 of the terminal. The module 20 is constructed so that with the top edge 21A resting against the bottom 24 of the terminal, and with parts 10 and 20 axially aligned, the coupler means 17, 24, e.g. standard D-type mating connectors, with automatically interengage as the module 20 is pressed axially toward the terminal 10. The latch finger 22 is initially deflected upwardly by a somewhat rounded forward edge 25 of the housing, after which the finger 22 snaps downwardly to interlock its latch portion 22a behind the marginal rim 23 to securely hold parts 10 and 20 together to form a unitary data capture assembly.

The scanner module may have a housing 30 with a lower shaped section 30A which may contain the scanner components and an upper section 30B which may contain the processing electronics. The scanner may direct scan energy along a path such as indicated at 31, FIG. 1, with lateral margins as at 31A, 31B, FIG. 2. A data source line (or lines) such as indicated at 33 may comprise a complete bar code symbol or other complete line of information which is to be automatically read by the scanner module. A complete image of the data source line or lines may enter the scanner module at a scanner window 35 via a data source image path 36 and be converted by the scanner module to data for transmission to a host processor or the like.

By way of example, scanner modules such as 20 may each be applied to the terminal 10 as shown, but may be configured to accommodate scanners with diverse scanner technologies such as the scanner technologies shown in the following pending patent applications:

(A) Arvin D. Danielson and Dennis A. Durbin application "INSTANT BAR CODE READER SYSTEM", U.S. Ser. No. 06/894,689 filed Aug. 8, 1986, (B) Jonathan R. White application "BAR CODE READER WITH ENHANCED SENSITIVITY", U.S. Ser. No. 06/905,779 filed Sep. 10, 1986, (C) Steven E. Koenck application "HANDHELD AREA IMAGE OPTICAL READER SYSTEM", U.S. Ser. No. 07/238,701 filed Aug. 31, 1988, (D) George E. Chadima, Jr. and Vadim Laser application "INSTANT PORTABLE BAR CODE READER", U.S. Ser. No. 07/234,880 filed Aug. 19, 1988, which is a continuation of Chadima Jr. and Laser U.S. Pat. No. 4,766,300 issued Aug. 23, 1988.

The disclosures including the drawings of each of applications (A), (B), (C) and (D) identified above is incorporated herein by reference in its entirely.

Referring to U.S. Pat. No. 4,766,300 which essentially conforms with incorporated application (D) in its drawings and corresponding description, scanner components of the fourth figure essentially fit within the scanner housing section 30A and emit a sheet like illumination beam along the scan energy path 31. The light energy may occupy a spectrum from 400 nanometers to 1,050 nanometers if a xenon flash tube source (60) is used in such fourth figure. A complete image of the data source line 33, e.g. a bar code symbol (11) as shown on a product container (12) in the first figure of U.S. Pat. No. 4,766,300, is transmitted along a data source image path 36 which may extend along an optical axis (64) as indicated in the fourth figure of U.S. Pat. No. 4,766,300. A scanner such as shown in U.S. Pat. No. 4,766,300 is a noncontact scanner since it is capable of reading data at a substantial distance in front of its housing end face corresponding to end face 37, FIGS. 1 and 3, (e.g. ten millimeters). The scanner of U.S. Pat. No. 4,766,300 has a substantial depth of field, e.g. ten millimeters, so as to be capable of reading a curved bar code label 1.8 inches long, having a radius of curvature greater than 1.25 inches, where the bar code has a minimum bar/space width of 7.5 mils (0.0075 inch), a contrast ratio of 50% or greater, and bars and spaces within ten percent of their nominal size, as described at col. 16 of U.S. Pat. No. 4,766,300.

As indicated in FIG. 2, where lateral margin lines 31A, 31B, represent the lateral margins of a scan energy path and the resultant lateral margins of a source data image path e.g. for a source data image entering window 35, FIG. 3, a path median plane is indicated at 40 which is perpendicular to the plane of frontal side 11 of the terminal and which substantially bisects the frontal side 11 as well as bisecting scan window 35.

The actuating button (18) of the first figure of U.S. Pat. No. 4,766,300 may be located centrally of upper housing 30B, as indicated at 42 in FIG. 2, so as to be actuated with the thumb (indicated at 43, FIG. 1) of either hand. The user may support the complete assembly in either hand, with the palm supporting underside 24 of terminal 10, e.g. adjacent module part 21 (as indicated at 44 in FIG. 1). With the terminal frontal panel 10 held so that display 14 has a horizontal axis 46 and is facing the user, a data source line or lines at 33 is readily visible to the user also, so that the scanner module may be conveniently aimed and triggered at 42, to effect a reading. In the same position of the assembly, the keys such as 12 are readily actuated by the free hand of the user, e.g. to enter quantity information or to manually enter data which proves not to be automatically readable.

By way of example, the housing part 30B may be equipped to decode bar code readings, so that decoded bar code information, verified as accurate, is sent via the mating coupling means 24, 17 to the terminal 10, for on-line transmission to a host processor, e.g. via antenna 15.

The adaptation of housing 30 to contain the scanners of each of the incorporated applications will be apparent to those skilled in the art from the foregoing description in relation to U.S. Pat. No. 4,766,300.

A family of scanner modules selectively attachable to a given data terminal may comprise either a set of scanners utilizing respective different scanner technologies (such as CCD, laser beam scan, and RF/ID), or a set of scanners of the same basic technology but of different characteristics, or a combination of scanner modules of different characteristics and scanner modules using different technologies as well. For example a family may include laser tube and laser diode cyclically deflected beam scanners with different spectral characteristics optimum for different types of bar codes and reading distances, and may also include CCD scanners having their optics adjusted to provide different reading distances in front of the module.

For each type of scanner module, the placement of the RF antenna is within the skill in the art. For example an extender may extend from end face 16 for a distance equal to module thickness at section 30B.

The modules each may have an opening such as indicated at 50 conforming with the diameter of the base part 51 of the antenna 15 so that correct alignment of connectors 17 and 24 is assured as the surface 21A slides along the housing undersurface 24 during assembly of the respective modules such as 20 with the housing 10.

DESCRIPTION OF FIG. 4

FIG. 4 shows elements corresponding to those of the third figure of the incorporated patent application (A) referred to hereinabove. Reference numerals from application (A) have been indicated in FIG. 4, but with the prefix "4-" to distinguish them from other reference numerals herein. Instead of the adjustment means (102, 103, 105, 111) of the incorporated application (A) FIG. 4 shows one of series of modules 400 having respective different fixed focal lengths together covering the range of adjustment provided by the adjustment means of the incorporate application (A).

Reference numeral 401 indicates diagrammatically that lens barrel 4-90 is to be fixed in a respective selected position for each respective different module, rather than having the lens barrel 4-90 motor driven to different positions. Different modules will have lug 402 of the lens barrel locked in respective different positions to cover a range of scan distances, such as contemplated in the incorporated application. Then by selecting modules such as 400 with appropriate fixed focal distances, a data terminal such as 10 may be adjusted to respective desired scanning distances appropriate to different fields of use.

In FIG. 4, an antenna extender 405 corresponds with base section 51 in serving to accurately guide the various modules so as to insure proper mating of the connectors. In FIG. 4, an active antenna part 415 is pivotal at 416 on the extender 405 so that it may be swung from a longitudinal or generally horizontal position as indicated by dash lines at 415A, to a generally upright position (with frontal panel 11 horizontal) as shown in solid lines. The antenna 415 does not obstruct removal of the scanner modules since it will swing to the longitudinal position 415A as the module is unsnapped from the terminal and removed.

DESCRIPTION OF FIGS. 5, 6 AND 7

FIGS. 5, 6 and 7 show the RF data terminal 10 with a RF/ID module 420 having a suitable electromagnetic field permeable housing 421 which contains the RF/ID antenna 422, and other suitable components. The angle of housing part 421A may be such that with the antenna 422 horizontal, the terminal 10 will be at an angle to a horizontal plane providing for convenient viewing of the terminal display 14 by the user holding the assembled device in either hand.

Different modules may provide different operating frequencies and RF/ID antennas so as to be adapted to respective different scanning distances such as represented at S1, S2, S3 covering a desired scanning range R.

DESCRIPTION OF FIGS. 8, 9 AND 10

Figure 9:
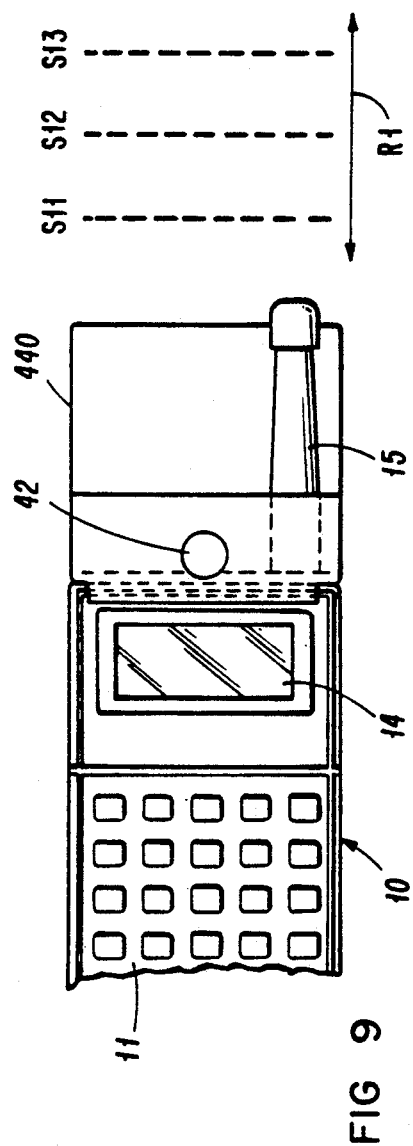
FIG. 9 is a diagrammatic partial top plan view of the embodiment of FIG. 8.
Figure 8:
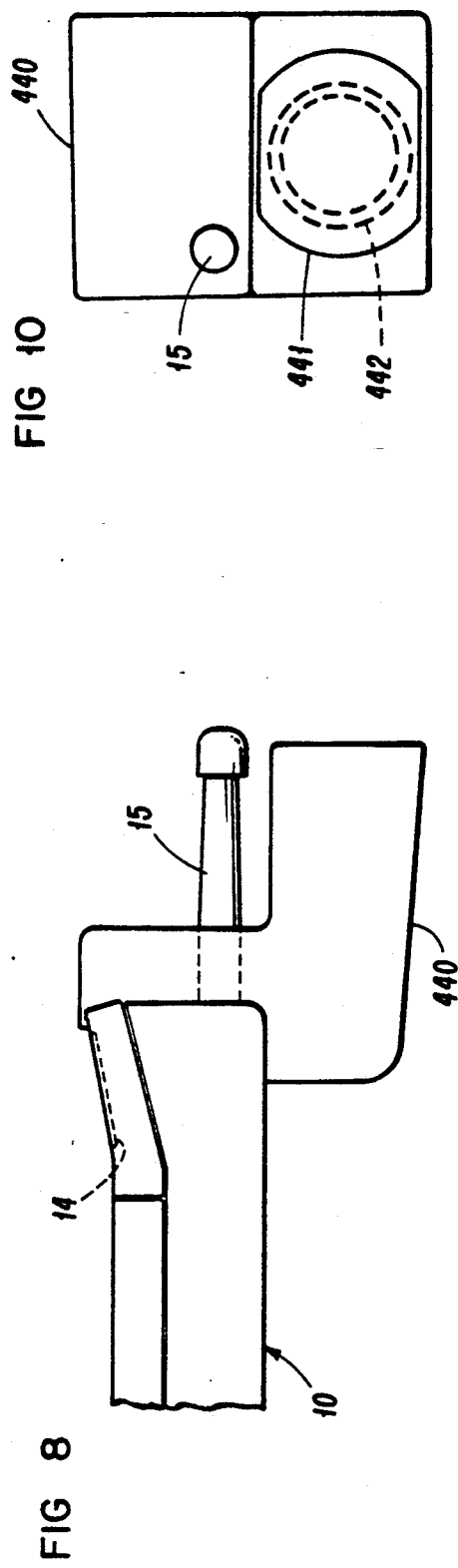
FIG. 8 is a diagrammatic partial side elevational view showing an area image data reader module applied to the standard data terminal of FIGS. 1-3 and 5-7.

FIGS. 8, 9 and 10, show an area type image reader module 440 applied to the terminal 10. Such modules may conform with incorporated application (C) referred to hereinabove. FIG. 10 shows a generally circular window 441, accommodating a circular xenon light source 442 such as shown (at 11) in the second figure of the incorporated application. Different modules such as 440 may have lens systems with different focal distances so as to accommodate reading over a range of scanning distances (such as indicted diagrammatically at S11, S12, S13 in FIG. 9, and covering a range R1).

Modules for the terminal 10 may utilize other scanner technologies. For example, instead of rotating mirror scanning of a laser beam, a similar rotating mirror scanning may be used with a light emitting diode beam source. Instead of one or two photodetectors, photosensor (e.g. CCD) line or area arrays may be used with cyclical laser beam scanning or cyclical LED scanning. For area arrays, an elongated beam cross section may be used and/or area raster type deflection of the beam (e.g. with respect to orthogonal x and y axes). Such technologies would be housed in module 20 of FIGS. 1, 2 and 3, for example, or module 440, FIGS. 8, 9 and 10, for the case of area photosensor arrays, so that further illustration of scanning beam type modules is deemed superfluous. Incorporated application (B) shows a scanning beam arrangement in the fourth figure which is adaptable to the module configuration of FIGS. 8, 9 and 10, for example.

In any of the embodiments the antenna parts external to wall 16 may be part of the scanner module and removable therewith. Also any of the antenna parts external to the module may be deflectable in any suitable direction, e.g. so as to be generally upright during scanning as described for antenna part 415, FIG. 4.

It will be apparent that many further modifications and variations may be effected without departing from the scope of the concepts and teachings of the present invention.

We claim as our invention:
1. In a data capture system,
   (a) handheld data capture terminal means of size and weight to be held in one hand and having radiant energy transmission means for transmitting data via a radiant energy link to a data receiving station,
   (b) said handheld data capture terminal means having terminal data coupler means for receiving data, and
   (c) scanner module means operable during a scanning operation for producing scanner data based on scanner coupling with a data source, said scanner module means being secured with said handheld data capture terminal means to form a data capture assembly of size and weight to be held in one hand during a scanning operation,
   (d) said scanner module means having scanner data coupler means for transmitting scanner data to the terminal data coupler means, such that scanner data obtained as a result of scanner coupling with a data source can be transmitted from the data capture assembly to a data receiving station via the radiant energy link, (e) said scanner module means having a scanner window means for admitting an optical image from at least an entire data source line of a data source, such that the data capture assembly may be held stationary relative to said data source line during reading of said data source line, (f) said scanner window means being arranged so as to be directed forwardly toward a data source while the data capture assembly is held in either hand by manual gripping of the handheld data capture terminal means rearwardly of the scanner module means and while a frontal operating side of the terminal means is presented to the user, and (g) said hand held terminal means having a frontal operating side with user data entry interface means thereat for observation by the user, said scanner module means being operable for scanning a horizontal data source line with said frontal operating side being generally horizontal and in facing relation to a user holding the terminal means.

2. In a data capture system according to claim 1, said handheld terminal means having a frontal operating side with data display means thereat for displaying scanner data produced by said scanner module means, said scanner module means being operable for scanning a horizontal data source line with said data display means substantially in facing relation to a user supporting the terminal means with either hand.

3. In a data capture system according to claim 1, said handheld terminal means being adapted to be held in the right or left hand with the same orientation during a scanning operation and with the same orientation of the scanner module means.

4. In a data capture system according to claim 1, said scanner module means being separable from the handheld terminal means such that the handheld terminal means is entirely ready for use as a separate device.

5. In a data capture system according to claim 1, said handheld terminal means having both said radiant energy transmission means and said terminal data coupler means at the same end thereof.

6. In a data capture system according to claim 5, said radiant energy transmission means comprising an antenna extending from said one end of the handheld terminal means in a direction substantially parallel to the longitudinal axis of the handheld terminal means.

7. In a data capture system according to claim 1, said radiant energy transmission means being mounted to accommodate changes in the position thereof.

8. In a data capture system according to claim 1, said scanner module having radiant energy transmission means coupled with the radiant energy transmission means of the terminal means for forming part of the radiant energy link.

9. In a data capture system according to claim 1, said scanner module means being an area image reader.

10. In a data capture system according to claim 1, said terminal means selectively receiving any of a series of scanner modules of diverse types for scanning respective diverse types of data sources, each of said scanner modules being selectively engageable with said terminal data coupler means for supply of scanner data thereto.

11. In a data capture system according to claim 1, said scanner module means comprising a scanner module housing having a width conforming with the width of said handheld data capture terminal means, and scanner means in the scanner module housing for emitting scanner energy along a scanner energy path for coupling with a data source and for generating scanner data based on scanner energy interaction with the data source, said scanner means providing for scanning of a data source located at a substantial distance from the scanner module housing, and scanner module securing means engageable with said terminal means to form a data capture unit capable of scanning a data source located at a substantial distance therefrom.

12. In a data capture system according to claim 11, said scanner means being an area image reader.

13. In a data capture system according to claim 1, said handheld data capture terminal means having a generally rectangular end portion, said scanner module means comprising socket means of generally rectangular configuration for receiving said generally rectangular end portion of said handheld data capture terminal means.

14. In a data capture system,
(a) handheld data capture terminal means of size and weight to be held in one hand, said handheld data capture terminal means having terminal data coupler means for receiving data, (b) scanner module means operable during a scanning operation for producing scanner data based on scanner coupling with a data source, said scanner module means being secured with said handheld data capture terminal means to form a data capture assembly of size and weight to be held in one hand during a scanning operation, (c) said scanner module means having scanner data coupler means for transmitting scanner data to the terminal data coupler means, said handheld terminal means having an elongated configuration suitable for gripping with one hand, with a frontal side for facing the user, and with a distal side directed away from the user, said terminal means being manually gripped with said scanner module means projecting scanning energy along a scan energy path having path lateral margins and having a path median plane intermediate such path lateral margins, which path median plane is substantially perpendicular to the frontal side and substantially bisects the frontal side such that the frontal side normally is held facing the user during a scanning operation, (d) said scanner module means having a scanner window means for admitting an optical image from at least an entire data source line of a data source, such that the data capture assembly may be held stationary relative to said data source line during reading of said data source line, and (e) said handheld terminal means having a frontal operating side with user data entry interface means thereat for observation by the user, said scanner module means being operable for scanning a horizontal data source line with said frontal operating side being generally horizontal and in facing relation to a user holding the terminal means.

15. In a data capture system according to claim 14, said scanner window means being arranged so as to be directed toward a data source line while the data capture terminal means is held in either hand and while a frontal operating side of the terminal means is presented to the user.

16. In a data capture system according to claim 14, said handheld terminal means having a frontal operating side with data display means thereat for displaying scanner data produced by said scanner module means, said scanner module means being operable for scanning a horizontal data source line with said data display means substantially in facing relation to a user supporting the terminal means with either hand.

17. In a data capture system according to claim 14, said handheld terminal means being adapted to be held in the right or left hand with the same orientation during a scanning operation and with the same orientation of the scanner module means.

18. In a data capture system according to claim 14, said scanner module means being separable from the handheld terminal means such that the handheld terminal means is entirely ready for use as a separate device.

19. In a data capture system according to claim 14, said handheld terminal means having radiant energy transmission means and said terminal data coupler means at one end thereof.

20. In a data capture system according to claim 19, said radiant energy transmission means comprising an antenna extending from said one end of the handheld terminal means in a direction substantially parallel to the longitudinal axis of the handheld terminal means.

21. In a data capture system according to claim 19, said radiant energy transmission means being mounted to accommodate changes in the position thereof.

22. In a data capture system according to claim 14, said scanner module having radiant energy transmission means.

23. In a data capture system according to claim 14, said scanner module means being an area image reader.

24. In a data capture system according to claim 14, said terminal means selectively receiving any of a series of scanner modules of diverse types for scanning respective diverse types of data sources, each of said scanner modules being selectively engageable with said handheld data capture terminal means for supply of scanner data thereto.

25. In a data capture system according to claim 14, said scanner module means comprising a scanner module housing having a width conforming with the width of said handheld data capture terminal means, and scanner means in the scanner module housing for emitting scanner energy along a scanner energy path for coupling with a data source and for generating scanner data based on scanner energy interaction with the data source, said scanner means providing for scanning of a data source located at a substantial distance from the scanner module housing, and scanner module securing means engageable with said terminal means to form a data capture unit capable of scanning a data source located at a substantial distance therefrom.

26. In a data capture system according to claim 25, said scanner means being an area image reader.

27. In a data capture system according to claim 14, said handheld data capture terminal means having a generally rectangular end portion, said scanner module means comprising socket means of generally rectangular configuration for receiving said generally rectangular end portion of said handheld data capture terminal means.

28. In a data capture system, a handheld data entry terminal having a terminal external data coupler means providing a data input to the terminal, and a scanner module having a scanner module external data coupler means for the transmission of scanner data and constructed for mating with the terminal external data coupler means, securing means for securing the scanner module with the terminal, with said scanner module external data coupler means mated with the terminal external data coupler means such that scanner data from the scanner module can be transmitted to the terminal, said scanner module having scanner means for scanning a data source at a source location substantially spaced from the scanner module and for reading a data source line at the source location while the terminal is held stationary relative to said data source line to generate scanner data representing such a data source line, said scanner means being arranged so as to be directed toward a data source line while the data entry terminal is held stationary in either hand and while a frontal operating side of the terminal is presented to the user; and wherein said handheld data entry terminal having a frontal operating side with data entry user interface means thereat for observation by the user, said scanner module being operable for scanning a horizontal data source line with said frontal operating side being generally horizontal and in facing relation to a user holding the terminal.

29. In a data capture system according to claim 25, said handheld data entry terminal having a frontal operating side with data display means thereat for displaying scanner data produced by said scanner module, said scanner module being operable for scanning a horizontal data source line with said data display means substantially in facing relation to a user supporting the terminal with either hand.

30. In a data capture system according to claim 28, said handheld data entry terminal being adapted to be held in the right or left hand with the same orientation during a scanning operation and with the same orientation of the scanner module.

31. In a data capture system according to claim 28, said handheld data entry terminal having a radiant energy transmission means and said scanner module at one end thereof.

32. In a data capture system according to claim 31, said scanner module being separable from the handheld data entry terminal without disturbance to said radiant energy transmission means.

33. In a data capture system according to claim 32, said radiant energy transmission means comprising an antenna extending from said one end of the handheld data entry terminal in a direction substantially parallel to the longitudinal axis of the handheld data entry terminal.

34. In a data capture system according to claim 33, said antenna being mounted to accommodate changes in the orientation thereof.

35. In a data capture system according to claim 28, said scanner module having radiant energy transmission means.

36. In a data capture system according to claim 28, said scanner module being an area image reader.

* * * * *